United States Patent
Yeh et al.

(10) Patent No.: US 9,431,853 B2
(45) Date of Patent: Aug. 30, 2016

(54) UNINTERRUPTIBLE POWER SYSTEM WITH BACKFEED DETECTION AND METHOD OF OPERATING THE SAME

(71) Applicant: DELTA ELECTRONICS, INC., Taoyuan County (TW)

(72) Inventors: Sung-Chieh Yeh, Taoyuan County (TW); Wei-Guo Shen, Taoyuan County (TW); Hui Zhou, Taoyuan County (TW); Zu-Cheng Liu, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 534 days.

(21) Appl. No.: 13/940,684

(22) Filed: Jul. 12, 2013

(65) Prior Publication Data

US 2014/0183958 A1  Jul. 3, 2014

(30) Foreign Application Priority Data

Dec. 28, 2012  (CN) .......................... 2012 1 0583686

(51) Int. Cl.
*H02J 9/06* (2006.01)
(52) U.S. Cl.
CPC ............ *H02J 9/062* (2013.01); *Y10T 307/625* (2015.04)
(58) Field of Classification Search
None
See application file for complete search history.

(56) References Cited

U.S. PATENT DOCUMENTS

| | | | | |
|---|---|---|---|---|
| 5,786,641 A * | 7/1998 | Nakanishi | .............. | G01R 31/40 307/131 |
| 7,282,813 B2 * | 10/2007 | Unger | ...................... | H02H 3/36 307/66 |
| 7,327,545 B2 * | 2/2008 | Konishi | ................ | H02J 7/1461 318/400.21 |
| 7,446,437 B2 * | 11/2008 | Paik | .......................... | H02J 9/06 307/115 |
| 8,716,885 B2 * | 5/2014 | Pfitzer | ....................... | H02J 3/14 307/11 |
| 2008/0252144 A1 * | 10/2008 | Wang | ...................... | H02J 9/062 307/66 |
| 2010/0133910 A1 * | 6/2010 | Lai | .......................... | H02J 9/062 307/66 |
| 2010/0148584 A1 * | 6/2010 | Yang | ......................... | H02J 7/02 307/66 |
| 2014/0021789 A1 * | 1/2014 | Greer | ........................ | H02J 9/06 307/64 |

FOREIGN PATENT DOCUMENTS

| | | |
|---|---|---|
| CN | 1200500 | 5/2005 |
| CN | 1996031 | 7/2007 |
| TW | I324428 | 5/2010 |

OTHER PUBLICATIONS

Office Action dated Dec. 4, 2014 from corresponding No. TW 102108339.

* cited by examiner

*Primary Examiner* — Rexford Barnie
*Assistant Examiner* — David Shiao
(74) *Attorney, Agent, or Firm* — Hauptman Ham, LLP

(57) ABSTRACT

An uninterruptible power system and a method of operating the same are disclosed. The uninterruptible power system includes a power conversion apparatus, a switch unit, a first voltage detection unit, a second voltage detection unit, and a comparison unit. The power conversion apparatus receives an AC power source and converts the AC power source to supply an AC load. The first voltage detection unit detects an input voltage of the power conversion apparatus and produces a first voltage signal. The second voltage detection unit detects an output voltage of the switch unit and produces a second voltage signal. Under the AC power source is disabled and the power conversion apparatus provides a backup power to supply the AC load, the switch unit is detected in a fault operation when the first voltage signal is compared by the comparison unit to equal to the second voltage signal.

19 Claims, 16 Drawing Sheets

UNINTERRUPTIBLE POWER SYSTEM WITH BACKFEED DETECTION AND METHOD OF OPERATING THE SAME

BACKGROUND

1. Technical Field

The present disclosure relates generally to an uninterruptible power system a method of operating the same, and more particularly to an uninterruptible power system with a function of backfeed failure detection and a method of operating the same.

2. Description of Related Art

Uninterruptible power supply (UPS), as the name indicates, is an electrical apparatus that provides emergency power to a load when the input power source, typically mains power, fails. Because the UPS is more complicated and more expensive than other emergency power apparatuses, the UPS is usually provided to protect important equipment, such as computer equipment, monitor instruments, fire equipment, medical instruments, and so on, thus achieving strict power requirements for the above-mentioned equipment and instruments. In addition, the UPS also provides voltage adjustment once the over-voltage or the under-voltage conditions occur. Furthermore, the UPS can provide good effect for restraining transient fluctuation and harmonic disturbance.

Reference is made to FIG. 1A which is a system block diagram of a related art uninterruptible power system operating in a backup supply operation. The uninterruptible power system mainly includes a two-stage power converter 10A, a static transfer switch 11A, a current sensor 12A, a voltage detector 13A, and a controller 14A. The uninterruptible power system receives an AC power source Vac and the two-stage power converter 10A converts the AC power source Vac into an AC output voltage to supply power to an AC load Ld. In particular, the two-stage power converter 10A has an AC-to-DC conversion circuit (not shown) and a DC-to-AC conversion circuit (not shown). Also, a rechargeable battery (not shown) and a charging circuit (not shown) are provided. When the AC power source Vac is disabled, the AC load Ld is supplied by the rechargeable battery. As shown in FIG. 1A, an output voltage of the static transfer switch 11A can be detected by the voltage detector 13A when the static transfer switch 11A is in a normal operation. Afterward, a voltage signal is sent to the controller 14A.

However, the stored energy of the rechargeable battery is fed back to the input terminal of the uninterruptible power system once the static transfer switch 11A is in an abnormal operation because two input terminals are shorted. In this condition, the uninterruptible power system must execute the shutdown protection. Reference is made to FIG. 1B which is a system block diagram of the related art uninterruptible power system operating in a backfeed failure operation. The current sensor 12A, which is usually the current transformer, is used to detect the current flowing through the bypass path. The backfeed failure occurs when the static transfer switch 11A is in an abnormal operation because two input terminals are shorted. In this condition, not only the voltage detector 13A detects the output voltage Vo but also the current sensor 12A simultaneously detects a great magnitude of current. Afterward, a current signal is sent to the controller 14A. The controller 14A confirms that the static transfer switch 11A is in the abnormal operation to cause the backfeed failure according to the voltage signal and the current signal.

However, the malfunctions of the current transformer would easily occur due to interruption of the large-current detection even if the uninterruptible power system is in the normal operation. Hence, the controller 14A wrongly detects that the backfeed failure occurs so that the uninterruptible power system must execute the shutdown protection.

Accordingly, it is desirable to provide an uninterruptible power system with a function of backfeed failure detection and a method of operating the same so as to achieve advantages of reduction in costs, simplicity of circuit designs, and utilization of occupied space, further significantly reduce malfunctions and increase accuracy of detecting the backfeed failure.

SUMMARY

An object of the present disclosure is to provide an uninterruptible power system to solve the above-mentioned problems. Accordingly, the uninterruptible power system includes a power conversion apparatus, a switch unit, a first voltage detection unit, a second voltage detection unit, and a comparison unit. The power conversion apparatus has an input terminal and an output terminal, the input terminal receives an AC power source and converts the AC power source to supply an AC load. The switch unit has a first input terminal, a second input terminal, and an output terminal. The second input terminal is connected to the output terminal of the power conversion apparatus and the first input terminal is connected to the input terminal of the power conversion apparatus. The first voltage detection unit is configured to detect an input voltage of the input terminal of the power conversion apparatus and is configured to produce a first voltage signal. The second voltage detection unit is configured to detect an output voltage of the output terminal of the switch unit and is configured to produce a second voltage signal. The comparison unit is configured to receive the first voltage signal and the second voltage signal and is configured to compare the first voltage signal and the second voltage signal. Wherein under the AC power source is disabled and the power conversion apparatus provides a backup power to supply the AC load, the switch unit is detected in a fault operation when the first voltage signal is identical to the second voltage signal, whereas the switch unit is detected in a normal operation when the first voltage signal is not identical to the second voltage signal.

Another object of the present disclosure is to provide a method of operating an uninterruptible power system to solve the above-mentioned problems. Accordingly, the method of operating the uninterruptible power system includes following steps: (a) judging whether the uninterruptible power system is in a backup supply operation; (b) judging whether a bypass input voltage of the uninterruptible power system is detected when the uninterruptible power system is in the backup supply operation; (c) judging whether an output voltage of the uninterruptible power system is coincident to the bypass input voltage and lasts for more than a predetermined time period when the bypass input voltage of the uninterruptible power system is detected; and (d) confirming that the uninterruptible power system is in a backfeed failure operation when the output voltage is coincident to the bypass input voltage and lasts for more than the predetermined time period.

Further another object of the present disclosure is to provide a method of operating an uninterruptible power system to solve the above-mentioned problems. Accordingly, the method of operating the uninterruptible power system includes following steps: (a) judging whether a bypass input voltage of the uninterruptible power system is detected; (b) judging whether the uninterruptible power system is in a backup supply operation when the bypass input voltage of the uninterruptible power system is detected; (c) judging whether an output voltage of the uninterruptible power system is coincident to the bypass input voltage and lasts for more than a predetermined time period when the uninterruptible power system is in the backup supply operation; and (d) confirming that the uninterruptible power system is in a backfeed failure operation when the output voltage is coincident to the bypass input voltage and lasts for more than the predetermined time period.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1A:
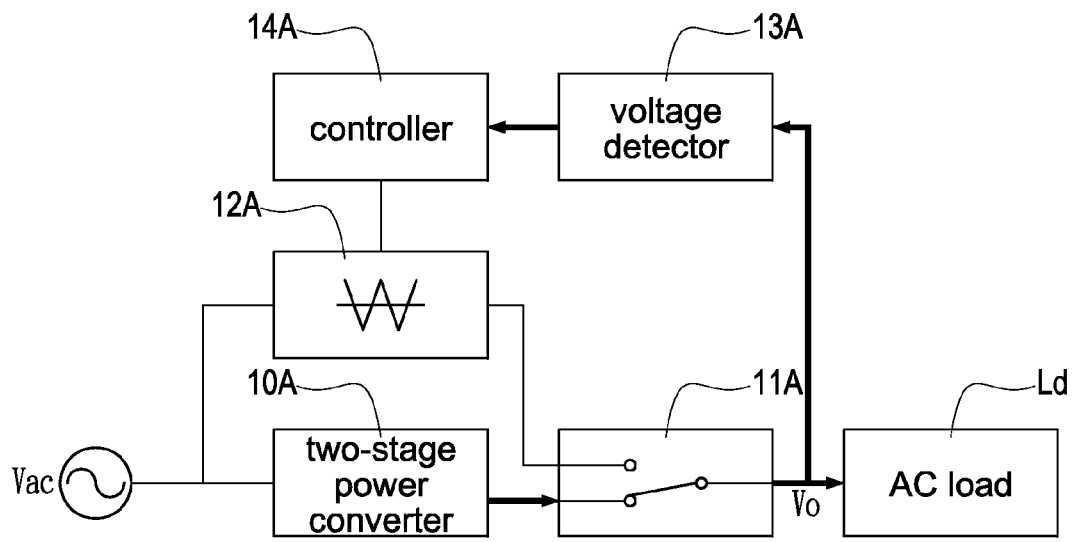
FIG. 1A is a system block diagram of a related art uninterruptible power system operating in a backup supply operation.
Figure 1B:
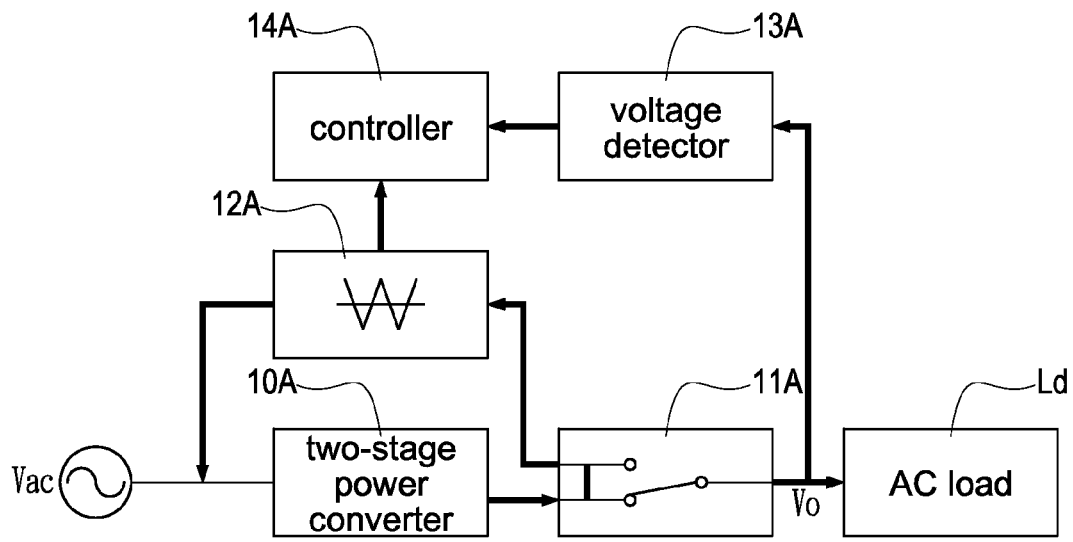
FIG. 1B is a system block diagram of the related art uninterruptible power system operating in a backfeed failure operation.

Reference will now be made to the drawing figures to describe the present invention in detail.

Figure 2:
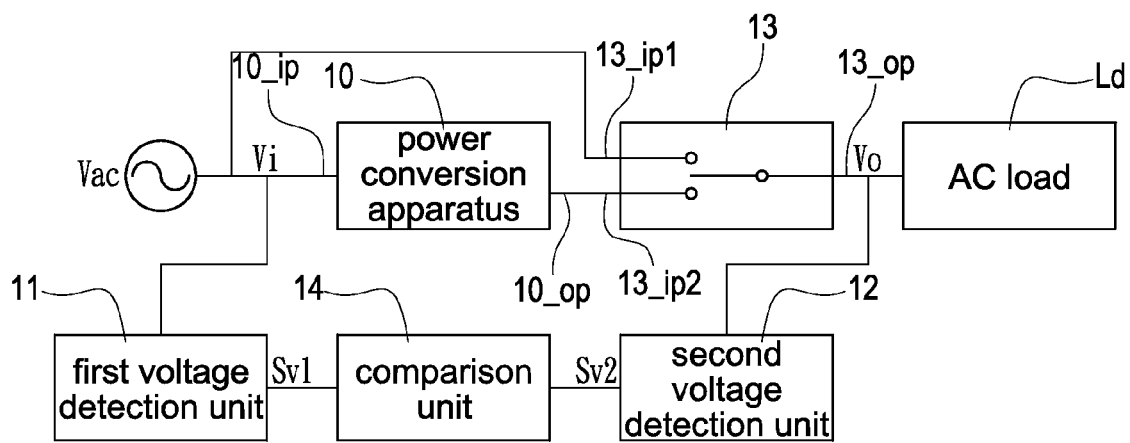
FIG. 2 is a system block diagram of an uninterruptible power system according to the present disclosure.

Reference is made to FIG. 2 which is a system block diagram of an uninterruptible power system according to the present disclosure. The uninterruptible power system includes a power conversion apparatus 10, a switch unit 13, a first voltage detection unit 11, a second voltage detection unit 12, and a comparison unit 14. The power conversion apparatus 10 has an input terminal 10_ip and an output terminal 10_op. The input terminal 10_ip receives an AC power source Vac and converts the AC power source Vac to supply an AC load Ld. The switch unit 13 has a first input terminal 13_ip1, a second input terminal 13_ip2, and an output terminal 13_op. The second input terminal 13_ip2 is connected to the output terminal 10_op of the power conversion apparatus 10 and the first input terminal 13_ip1 is connected to the input terminal 10_ip of the power conversion apparatus 10. The switch unit 13 can be a static transfer switch (STS). The first voltage detection unit 11 detects an input voltage Vi of the input terminal 10_ip of the power conversion apparatus 10 and produces a first voltage signal Sv1. The second voltage detection unit 12 detects an output voltage Vo of the output terminal 13_op of the switch unit 13 and produces a second voltage signal Sv2.

The comparison unit 14 receives the first voltage signal Sv1 and the second voltage signal Sv2 and compares the first voltage signal Sv1 and the second voltage signal Sv2. In particular, under the AC power source Vac is disabled and the power conversion apparatus 10 provides a backup power to supply the AC load Ld, the switch unit 13 is detected in a fault operation when the first voltage signal Sv1 is identical to the second voltage signal Sv2, whereas the switch unit 13 is detected in a normal operation when the first voltage signal Sv1 is not identical to the second voltage signal Sv2.

Figure 3:
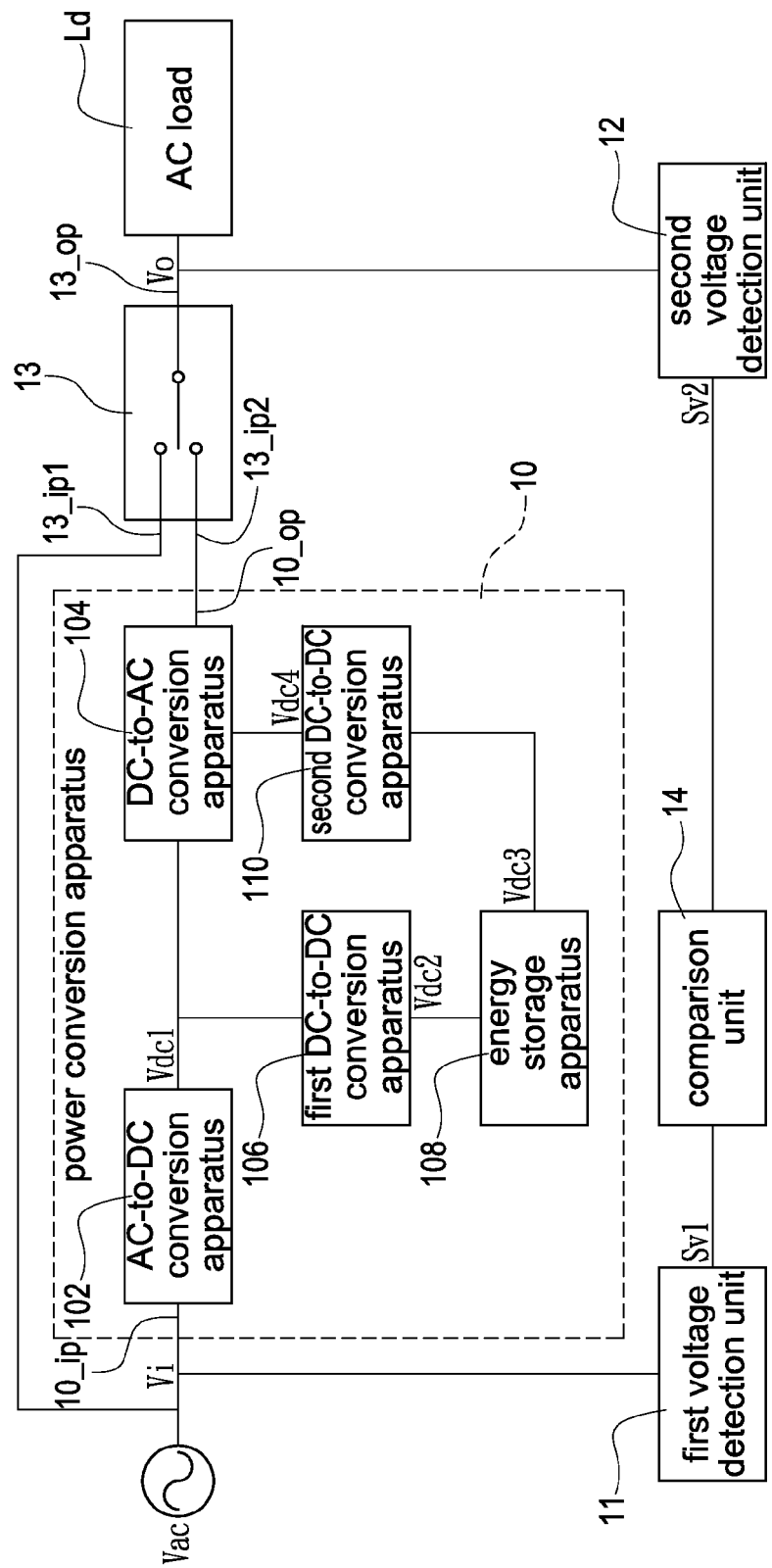
FIG. 3 is a schematic block diagram of a power conversion apparatus of the uninterruptible power system according to the present disclosure.

Reference is made to FIG. 3 which is a schematic block diagram of a power conversion apparatus of the uninterruptible power system according to the present disclosure. The power conversion apparatus 10 has an AC-to-DC conversion apparatus 102, a DC-to-AC conversion apparatus 104, a first DC-to-DC conversion apparatus 106, an energy storage apparatus 108, and a second DC-to-DC conversion apparatus 110. The AC-to-DC conversion apparatus 102 receives the AC power source Vac and converts the AC power source Vac into a first DC voltage Vdc1. The DC-to-AC conversion apparatus 104 receives the first DC voltage Vdc1 and converts the first DC voltage Vdc1 into a first AC voltage Vac1. The first DC-to-DC conversion apparatus 106 receives the first DC voltage Vdc1 and converts the first DC voltage Vdc1 into a second DC voltage Vdc2. The energy storage apparatus 108 receives the second DC voltage Vdc2 and is charged by the second DC voltage Vdc2 to store energy and to produce a third DC voltage Vdc3. In particular, the energy storage apparatus 108 is a rechargeable battery and the first DC-to-DC conversion apparatus 106 is a battery charger. The second DC voltage Vdc2 produced from the first DC-to-DC conversion apparatus 106 is the required voltage for charging the energy storage apparatus 108. The second DC-to-DC conversion apparatus 110 receives the third DC voltage Vdc3 and converts the third DC voltage Vdc3 into a fourth DC voltage Vdc4. The detailed operation of the uninterruptible power system with the function of backfeed failure detection will be described hereinafter as follows.

Figure 4A:
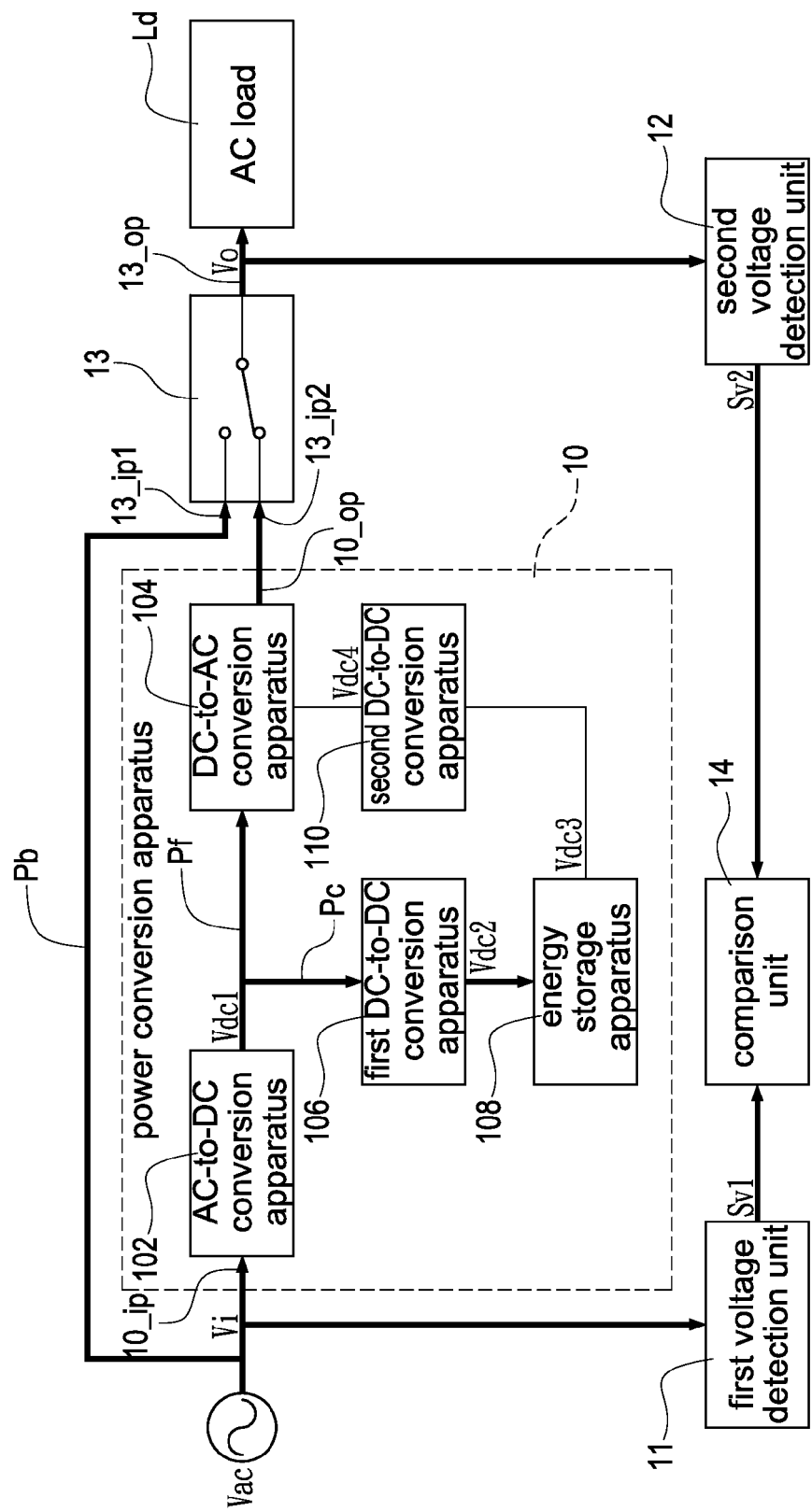
FIG. 4A is a schematic block diagram of the uninterruptible power system operating in a first power supply mode according to the present disclosure.
Figure 4B:
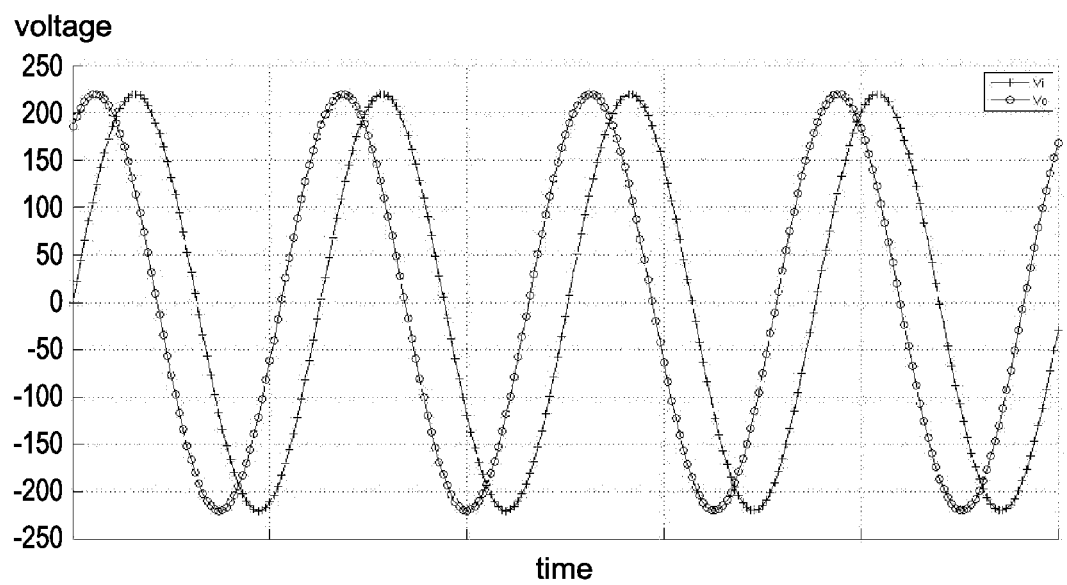
FIG. 4B is a schematic waveform graph of an input voltage and an output voltage of the uninterruptible power system operating in the first power supply mode according to the present disclosure.

The detailed operation of the uninterruptible power system with the function of backfeed failure detection will be described as follows depending on different power supply modes. Reference is made to FIG. 4A which is a schematic block diagram of the uninterruptible power system operating in a first power supply mode according to the present disclosure. In the present disclosure, the first power supply mode represents that the AC power source Vac delivers power to the AC load Ld without through a bypass path of the uninterruptible power system. Under the first power supply mode, the AC power source Vac is delivered to the first input terminal 13_ip1 of the static transfer switch 13 through a bypass path Pb (illustrated by the bold solid line). In addition, the AC power source Vac is also delivered to the second input terminal 13_ip2 of the static transfer switch 13 through a forward path Pf to which the AC-to-DC conversion apparatus 102 and the DC-to-AC conversion apparatus 104 are connected (illustrated by the bold solid line). Furthermore, the AC power source Vac is also delivered and converted to charge the energy storage apparatus 108 through a charging path Pc to which the AC-to-DC conversion apparatus 102, the first DC-to-DC conversion apparatus 106, and the energy storage apparatus 108 are connected (illustrated by the bold solid line). Especially, under the first power supply mode, the second input terminal 13_ip2 of the static transfer switch 13 is switched to connect to the output terminal 13_op so that the AC power source Vac is provided to supply power to the AC load Ld through the forward path Pf. Reference is made to FIG. 4B which is a schematic waveform graph of an input voltage and an output voltage of the uninterruptible power system operating in the first power supply mode according to the present disclosure. At this time, the input voltage Vi (expressed by the plus sign) of the input terminal 10_ip is detected by the first voltage detection unit 11 and the output voltage Vo (expressed by the circle sign) of the output terminal 13_op is detected by the second voltage detection unit 12 are shown in FIG. 4B. Because the AC power source Vac is normally delivered to supply the AC load Ld through the forward path Pf rather than the bypass path Pb, the input voltage Vi detected by the first voltage detection unit 11 is the AC power source Vac and the output voltage Vo detected by the second voltage detection unit 12 is the voltage of supplying the AC load Ld. Hence, identical frequency and amplitude relationships and different phase relationship between the input voltage Vi and the output voltage Vo are acquired after comparing the first voltage signal Sv1 and the second voltage signal Sv2 by the comparison unit 14.

Figure 5A:
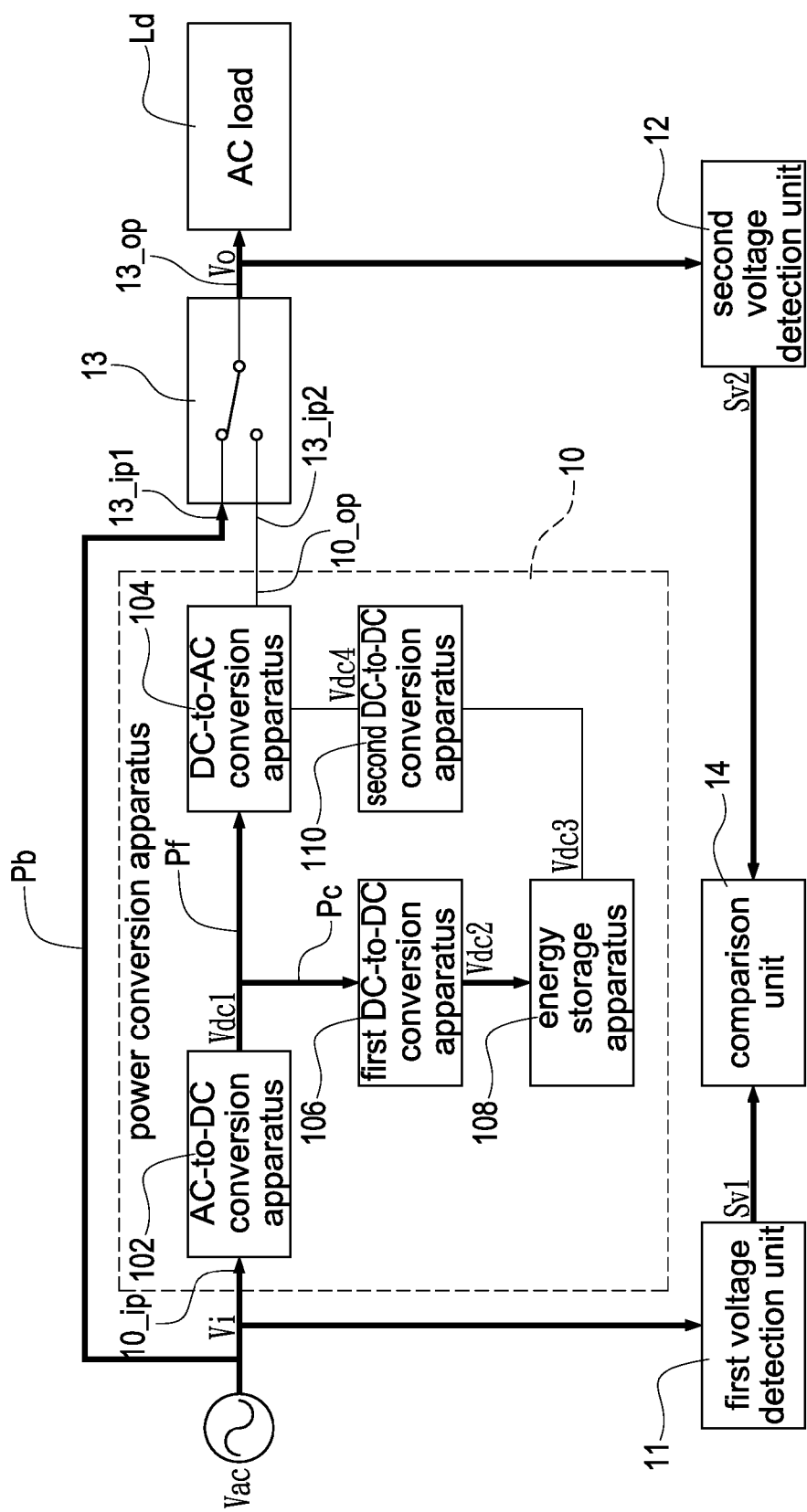
FIG. 5A is a schematic block diagram of the uninterruptible power system operating in a second power supply mode according to the present disclosure.
Figure 5B:
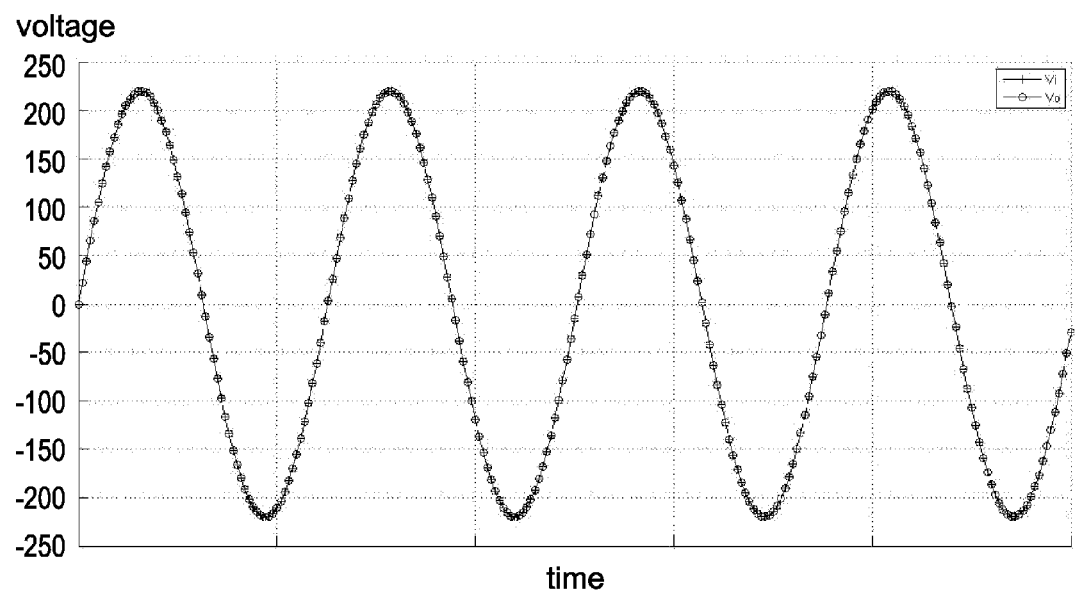
FIG. 5B is a schematic waveform graph of an input voltage and an output voltage of the uninterruptible power system operating in the second power supply mode according to the present disclosure.

Reference is made to FIG. 5A which is a schematic block diagram of the uninterruptible power system operating in a second power supply mode according to the present disclosure. In the present disclosure, the second power supply mode represents that the AC power source Vac delivers power to the AC load Ld through the bypass path of the uninterruptible power system. Under the second power supply mode, the AC power source Vac is delivered to the first input terminal 13_ip1 of the static transfer switch 13 through the bypass path Pb (illustrated by the bold solid line). In addition, the AC power source Vac is also delivered to the second input terminal 13_ip2 of the static transfer switch 13 through the forward path Pf to which the AC-to-DC conversion apparatus 102 and the DC-to-AC conversion apparatus 104 are connected (illustrated by the bold solid line). Furthermore, the AC power source Vac is also delivered and converted to charge the energy storage apparatus 108 through the charging path Pc to which the AC-to-DC conversion apparatus 102, the first DC-to-DC conversion apparatus 106, and the energy storage apparatus 108 are connected (illustrated by the bold solid line). Especially, under the second power supply mode, the first input terminal 13_ip1 of the static transfer switch 13 is switched to connect to the output terminal 13_op so that the AC power source Vac is provided to supply power to the AC load Ld through the bypass path Pb. Reference is made to FIG. 5B which is a schematic waveform graph of an input voltage and an output voltage of the uninterruptible power system operating in the second power supply mode according to the present disclosure. At this time, the input voltage Vi (expressed by the plus sign) of the input terminal 10_ip is detected by the first voltage detection unit 11 and the output voltage Vo (expressed by the circle sign) of the output terminal 13_op is detected by the second voltage detection unit 12 are shown in FIG. 5B. Because the AC power source Vac is delivered to normally supply power to the AC load Ld through the bypass path Pb, the input voltage Vi detected by the first voltage detection unit 11 is the AC power source Vac and the output voltage Vo detected by the second voltage detection unit 12 is also the AC power source Vac. Hence, identical frequency, amplitude, and phase relationships between the input voltage Vi and the output voltage Vo are acquired after comparing the first voltage signal Sv1 and the second voltage signal Sv2 by the comparison unit 14. Accordingly, the input voltage Vi and the output voltage Vo are coincident.

Figure 6A:
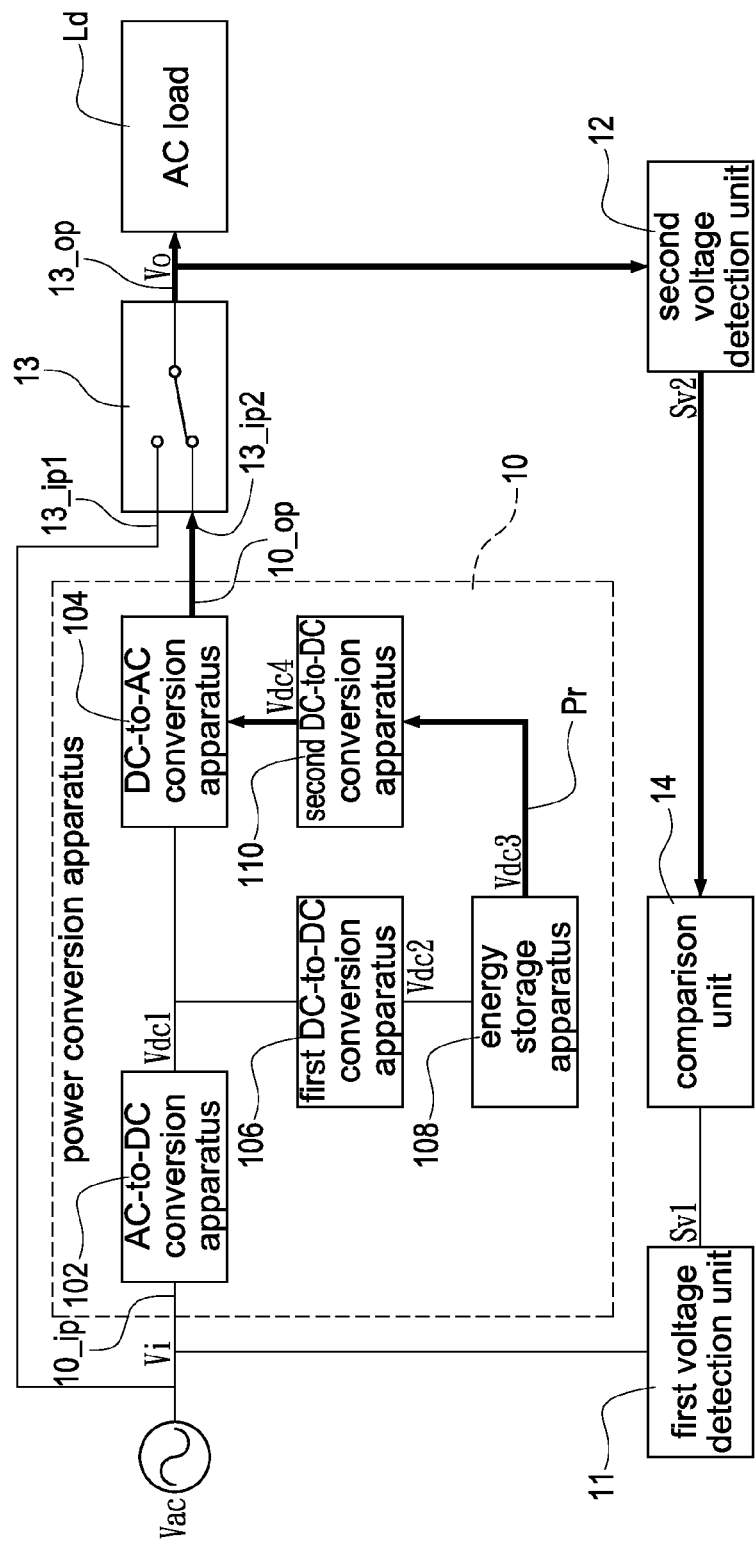
FIG. 6A is a schematic block diagram of the uninterruptible power system operating in a third power supply mode according to the present disclosure.
Figure 6B:
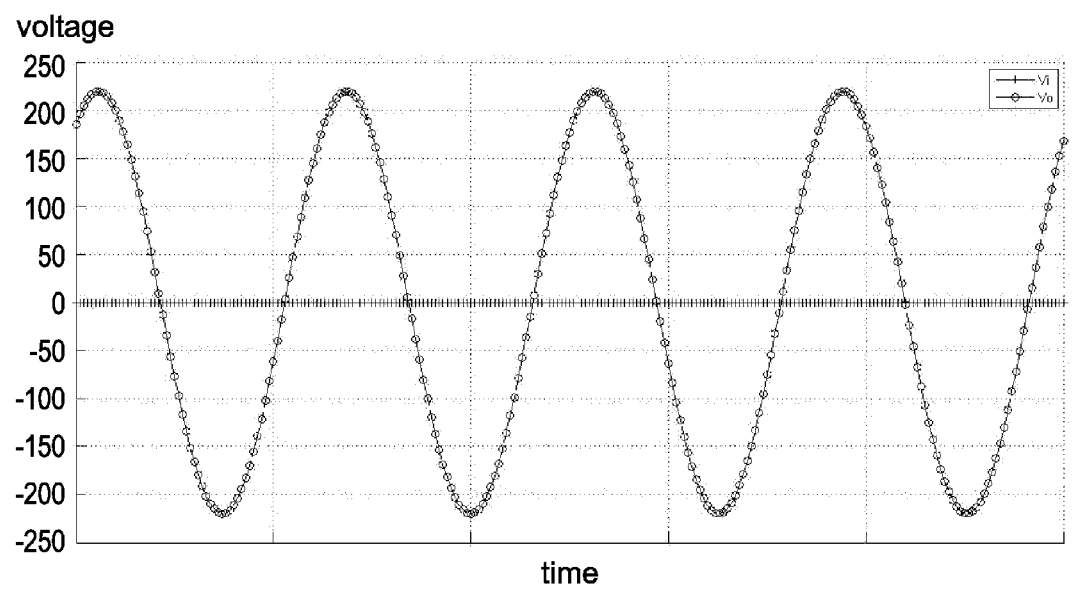
FIG. 6B is a schematic waveform graph of an input voltage and an output voltage of the uninterruptible power system operating in the third power supply mode according to the present disclosure.

Reference is made to FIG. 6A which is a schematic block diagram of the uninterruptible power system operating in a third power supply mode according to the present disclosure. In the present disclosure, the third power supply mode represents that the energy storage apparatus 108 delivers the backup power to the AC load Ld. Under the third power supply mode, the AC power source Vac is disabled. Hence, the third DC voltage Vdc3 produced from the energy storage apparatus 108 is delivered to the second input terminal 13_ip2 of the static transfer switch 13 through an energy-releasing path Pr to which the energy storage apparatus 108, the second DC-to-DC conversion apparatus 110, and the DC-to-AC conversion apparatus 104 are connected (illustrated by the bold solid line). Especially, under the third power supply mode, the second input terminal 13_ip2 of the static transfer switch 13 is switched to connect to the output terminal 13_op so that the energy stored in the energy storage apparatus 108 is provided to supply power to the AC load Ld through the energy-releasing path Pr (illustrated by the bold solid line). Reference is made to FIG. 6B which is a schematic waveform graph of an input voltage and an output voltage of the uninterruptible power system operating in the third power supply mode according to the present disclosure. At this time, the input voltage Vi (expressed by the plus sign) of the input terminal 10_ip is detected by the first voltage detection unit 11 and the output voltage Vo (expressed by the circle sign) of the output terminal 13_op is detected by the second voltage detection unit 12 are shown in FIG. 6B. Because the energy storage apparatus 108 releases the stored energy to provide the backup power to the AC load Ld, the input voltage Vi detected by the first voltage detection unit 11 is the AC power source Vac to zero and the output voltage Vo detected by the second voltage detection unit 12 is the voltage which is converted from the third DC voltage Vdc3 through the second DC-to-DC conversion apparatus 110 and the DC-to-AC conversion apparatus 104. Hence, different frequency, amplitude, and phase relationships between the input voltage Vi and the output voltage Vo are acquired after comparing the first voltage signal Sv1 and the second voltage signal Sv2 by the comparison unit 14.

Figure 7A:
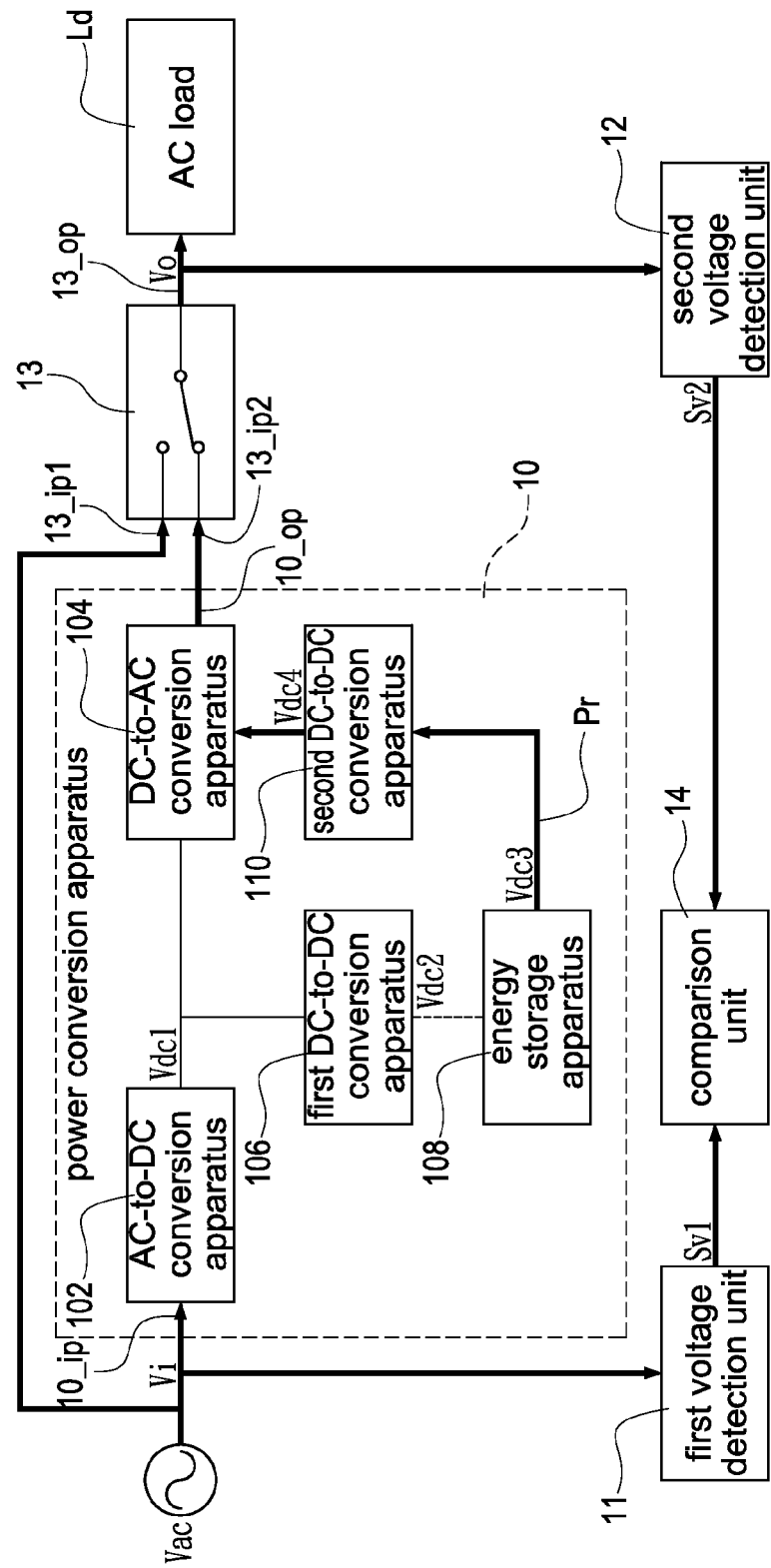
FIG. 7A is a schematic block diagram of the uninterruptible power system operating in a fourth power supply mode according to the present disclosure.
Figure 7B:
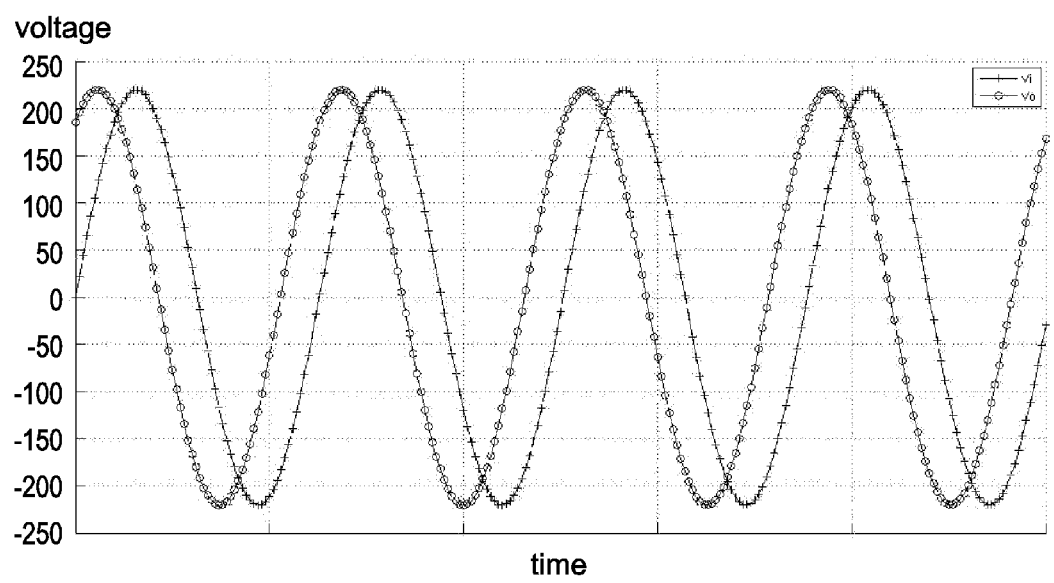
FIG. 7B is a schematic waveform graph of an input voltage and an output voltage of the uninterruptible power system operating in the fourth power supply mode according to the present disclosure.

Reference is made to FIG. 7A which is a schematic block diagram of the uninterruptible power system operating in a fourth power supply mode according to the present disclosure. In the present disclosure, the fourth power supply mode represents that the energy storage apparatus 108 delivers the backup power to the AC load Ld and the AC power source Vac initially restores power services. Under the fourth power supply mode, the AC power source Vac is initially restored and the AC power source Vac is delivered to the first input terminal 13_ip1 of the static transfer switch 13 through the bypass path Pb (illustrated by the bold solid line). In addition, the third DC voltage Vdc3 produced from the energy storage apparatus 108 is delivered to the second input terminal 13_ip2 of the static transfer switch 13 through the energy-releasing path Pr to which the energy storage apparatus 108, the second DC-to-DC conversion apparatus 110, and the DC-to-AC conversion apparatus 104 are connected (illustrated by the bold solid line). Especially, under the fourth power supply mode, the second input terminal 13_ip2 of the static transfer switch 13 is switched to connect to the output terminal 13_op so that the energy stored in the energy storage apparatus 108 is provided to supply power to the AC load Ld through the energy-releasing path Pr (illustrated by the bold solid line). Reference is made to FIG. 7B which is a schematic waveform graph of an input voltage and an output voltage of the uninterruptible power system operating in the fourth power supply mode according to the present disclosure. At this time, the input voltage Vi (expressed by the plus sign) of the input terminal 10_ip is detected by the first voltage detection unit 11 and the output voltage Vo (expressed by the circle sign) of the output terminal 13_op is detected by the second voltage detection unit 12 are shown in FIG. 7B. Because the energy storage apparatus 108 releases the stored energy to provide the backup power to the AC load Ld and the AC power source Vac is initially restored through the bypass path Pb, the input voltage Vi detected by the first voltage detection unit 11 is the AC power source Vac and the output voltage Vo detected by the second voltage detection unit 12 is the voltage which is converted from the third DC voltage Vdc3 through the second DC-to-DC conversion apparatus 110 and the DC-to-AC conversion apparatus 104. Hence, identical frequency and amplitude relationships and different phase relationship between the input voltage Vi and the output voltage Vo are acquired after comparing the first voltage signal Sv1 and the second voltage signal Sv2 by the comparison unit 14.

Figure 8A:
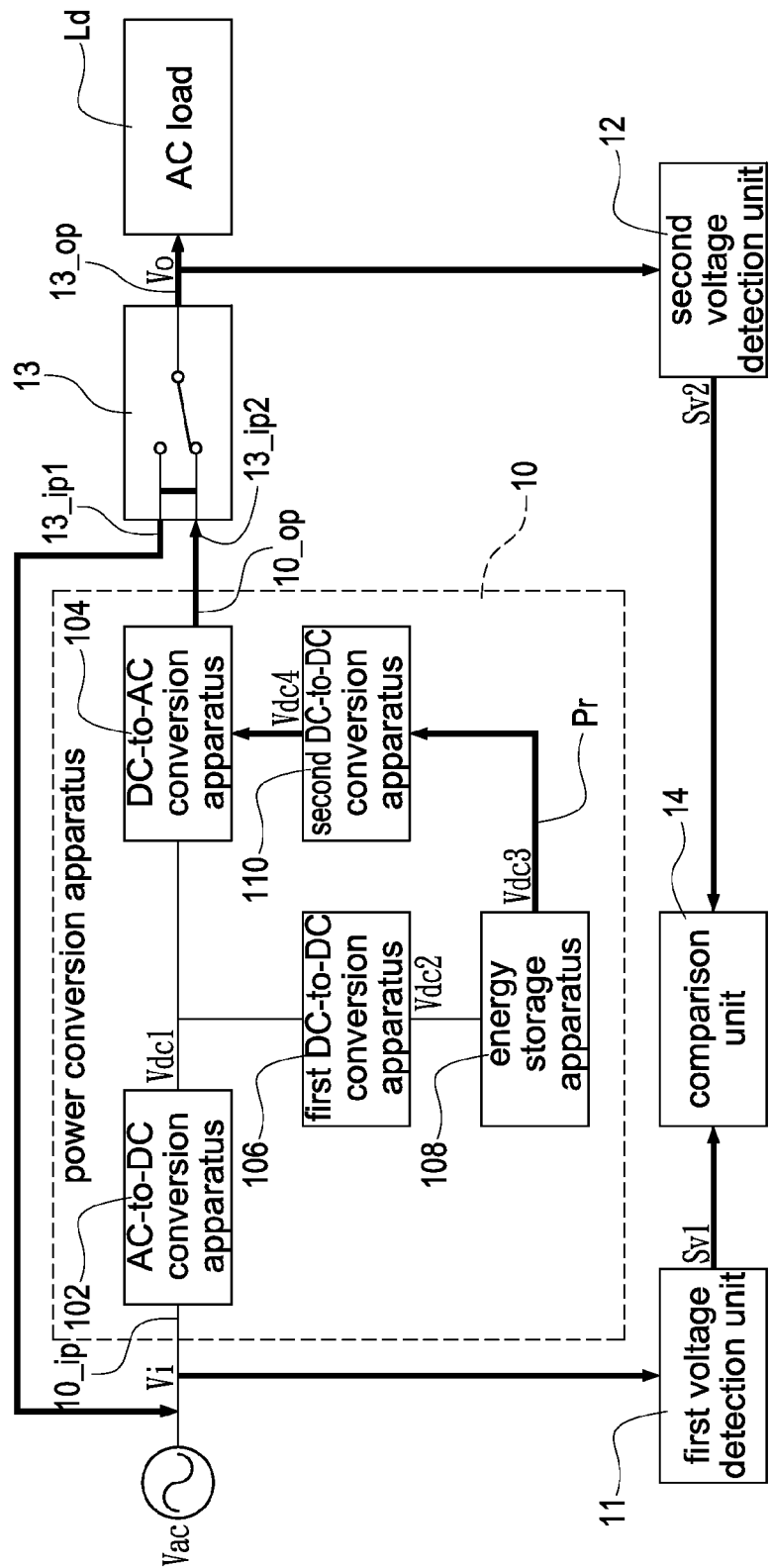
FIG. 8A is a schematic block diagram of the uninterruptible power system operating in a fifth power supply mode according to the present disclosure.
Figure 8B:
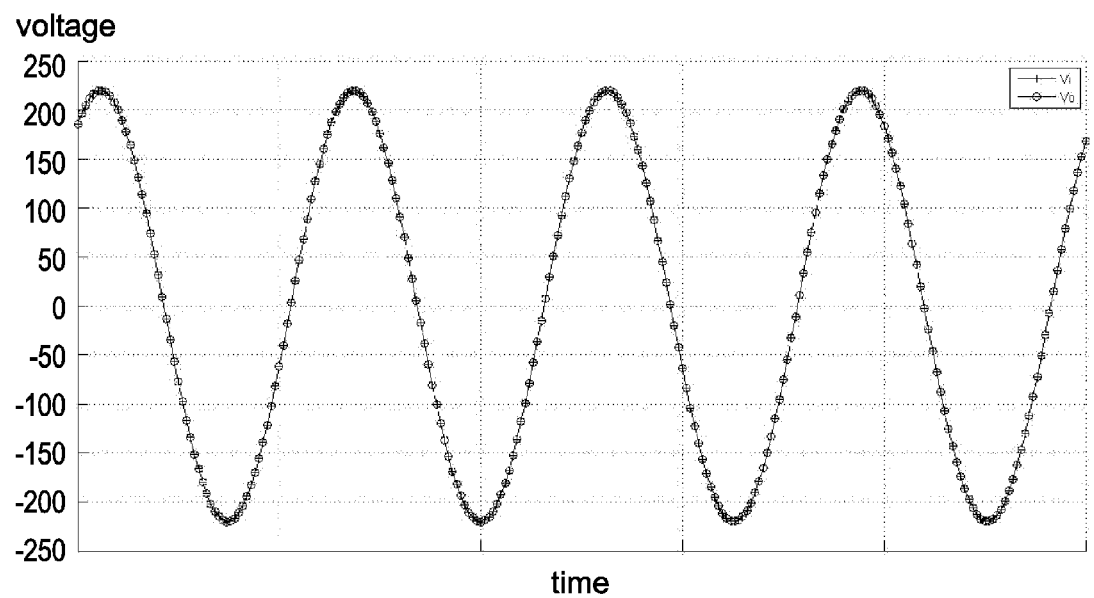
FIG. 8B is a schematic waveform graph of an input voltage and an output voltage of the uninterruptible power system operating in the fifth power supply mode according to the present disclosure.

Reference is made to FIG. 8A which is a schematic block diagram of the uninterruptible power system operating in a fifth power supply mode according to the present disclosure. In the present disclosure, the fifth power supply mode represents that the energy storage apparatus 108 delivers the backup power to the AC load Ld but a backfeed failure occurs. Under the fifth power supply mode, the AC power source Vac is disabled. Hence, the third DC voltage Vdc3 produced from the energy storage apparatus 108 is delivered to the second input terminal 13_ip2 of the static transfer switch 13 through the energy-releasing path Pr to which the energy storage apparatus 108, the second DC-to-DC conversion apparatus 110, and the DC-to-AC conversion apparatus 104 are connected (illustrated by the bold solid line). Especially, under the fifth power supply mode, the second input terminal 13_ip2 of the static transfer switch 13 is switched to connect to the output terminal 13_op so that the energy stored in the energy storage apparatus 108 is provided to supply power to the AC load Ld through the energy-releasing path Pr (illustrated by the bold solid line). However, because the switch unit 13 is in a fault operation (in this embodiment, the first input terminal 13_ip1 and the second input terminal 13_ip2 are shorted.) Hence, the backup power generated from the energy storage apparatus 108 is fed back to the input terminal 10_ip of the power conversion apparatus 10 through the bypass path Pb (illustrated by the bold solid line). Reference is made to FIG. 8B which is a schematic waveform graph of an input voltage and an output voltage of the uninterruptible power system operating in the fifth power supply mode according to the present disclosure. At this time, the input voltage Vi (expressed by the plus sign) of the input terminal 10_ip is detected by the first voltage detection unit 11 and the output voltage Vo (expressed by the circle sign) of the output terminal 13_op is detected by the second voltage detection unit 12 are shown in FIG. 8B. Because the energy storage apparatus 108 releases the stored energy to provide the backup power to the AC load Ld but the backfeed failure occurs, the input voltage Vi detected by the first voltage detection unit 11 and the output voltage Vo detected by the second voltage detection unit 12 are identical, that is, the detected input voltage Vi and the output voltage Vo are the voltage which is converted from the third DC voltage Vdc3 through the second DC-to-DC conversion apparatus 110 and the DC-to-AC conversion apparatus 104. Hence, identical frequency, amplitude, and phase relationships between the input voltage Vi and the output voltage Vo are acquired after comparing the first voltage signal Sv1 and the second voltage signal Sv2 by the comparison unit 14. Accordingly, the input voltage Vi and the output voltage Vo are coincident. In this condition, the switch unit 13 is detected in the fault operation and the uninterruptible power system is in the backfeed failure operation. Especially, in order to confirm that the waveform coincidence is caused because of the fault operation of the switch unit 13 rather than unexpected operations, it is to judge whether the input voltage Vi is coincident to the output voltage Vo and lasts for more than the predetermined time period, such as several cycles to confirm that the switch unit 13 is in the fault operation.

Figure 9:
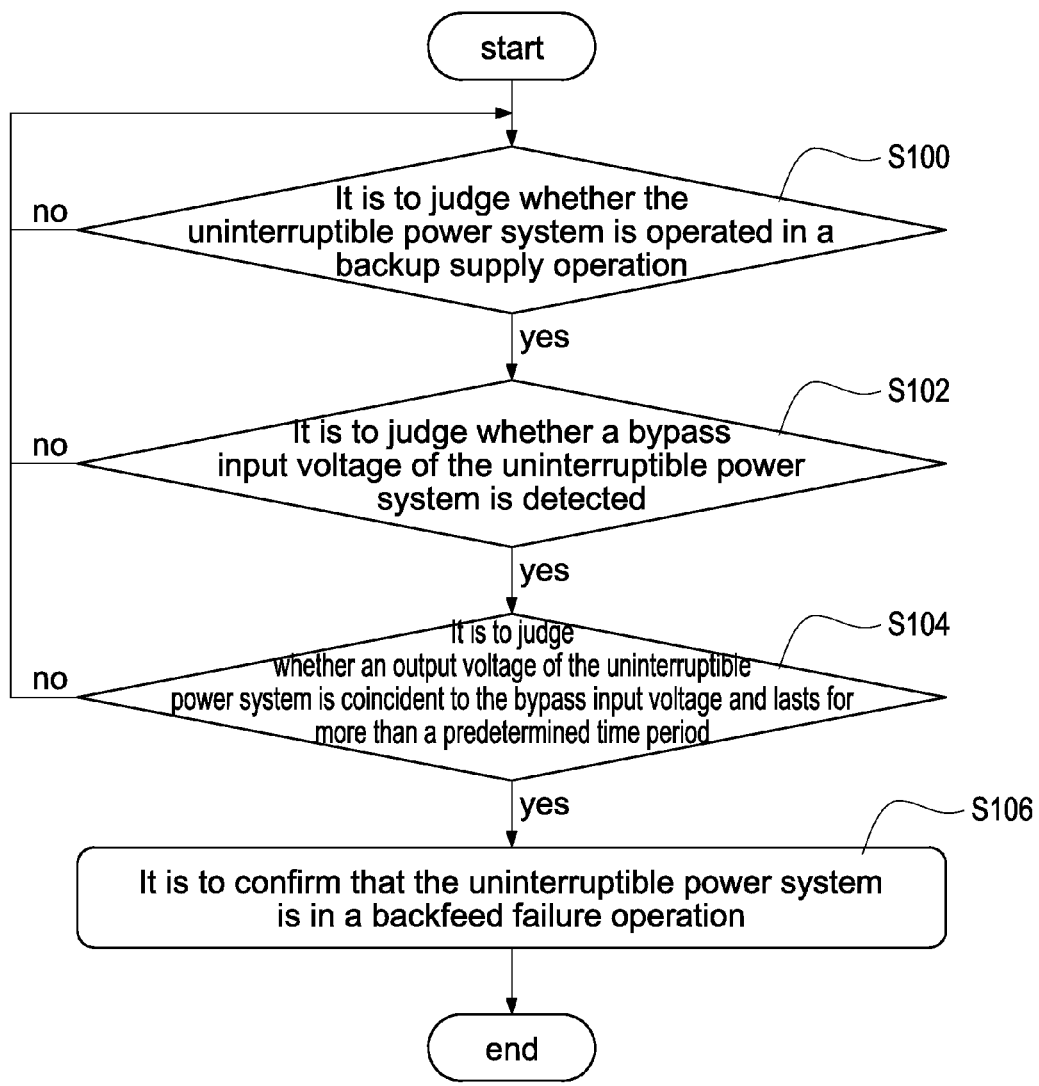
FIG. 9 is a flowchart of a method of operating an uninterruptible power system according to a first embodiment of the present disclosure.

Reference is made to FIG. 9 which is a flowchart of a method of operating an uninterruptible power system according to a first embodiment of the present disclosure. The method includes following steps: First, it is to judge whether the uninterruptible power system is operated in a backup supply operation (S100). Afterward, when the uninterruptible power system is operated in the backup supply operation, it is to judge whether a bypass input voltage of the uninterruptible power system is detected (S102). Afterward, when the bypass input voltage of the uninterruptible power system is detected, it is to judge whether an output voltage of the uninterruptible power system is coincident to the bypass input voltage and lasts for more than a predetermined time period (S104). Finally, it is to confirm that the uninterruptible power system is in a backfeed failure operation when the output voltage is coincident to the bypass input voltage and lasts for more than the predetermined time period (S106). On the contrary, when the output voltage is coincident to the bypass input voltage but lasts for less than the predetermined time period, it is to confirm that the uninterruptible power system is in a normal backup operation.

Figure 10:
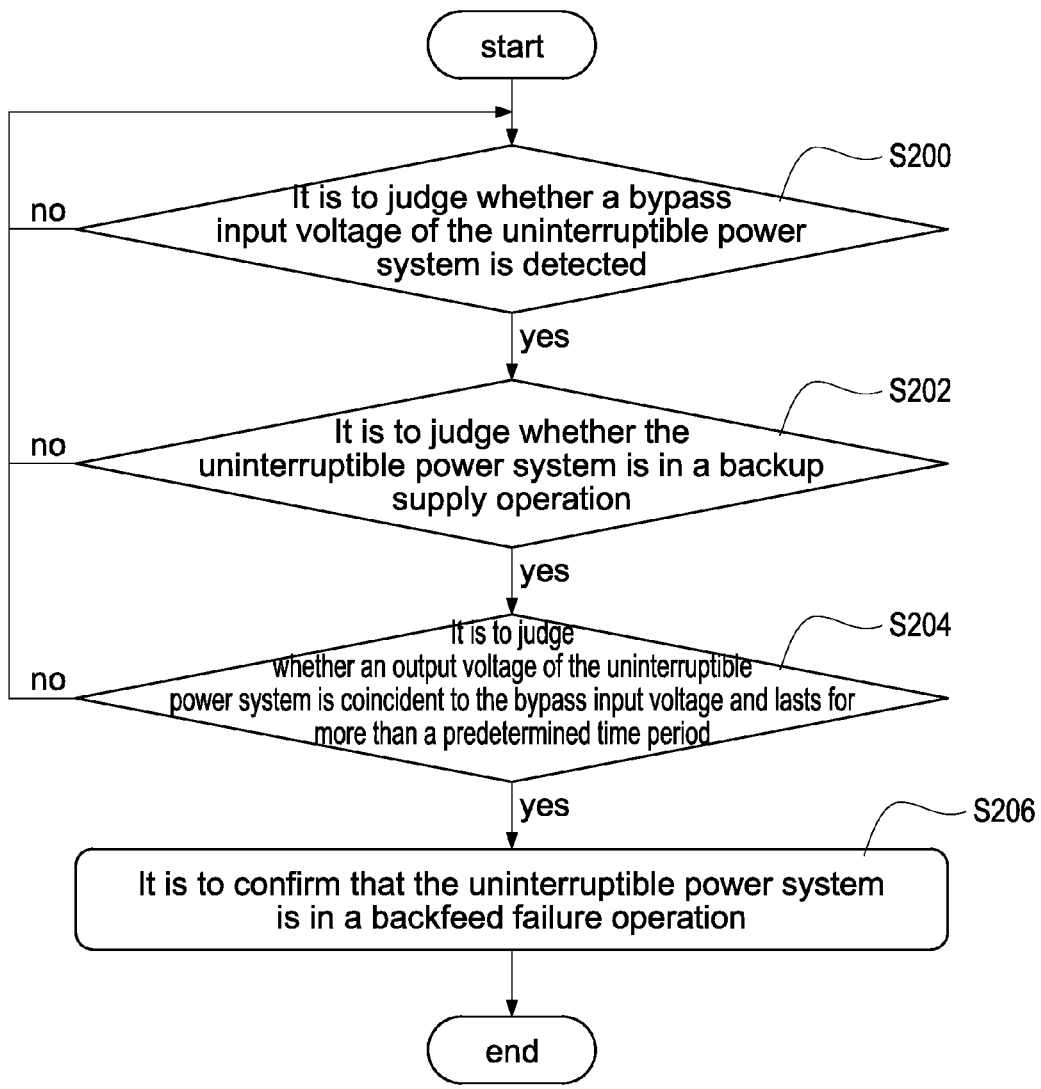
FIG. 10 is a flowchart of a method of operating the uninterruptible power system according to a second embodiment of the present disclosure.

Reference is made to FIG. 10 which is a flowchart of a method of operating the uninterruptible power system according to a second embodiment of the present disclosure. The method includes following steps: First, it is to judge whether a bypass input voltage of the uninterruptible power system is detected (S200). Afterward, when the bypass input voltage of the uninterruptible power system is detected, it is to judge whether the uninterruptible power system is in a backup supply operation (S202). Afterward, when the uninterruptible power system is in a backup supply operation, it is to judge whether an output voltage of the uninterruptible power system is coincident to the bypass input voltage and lasts for more than a predetermined time period (S204). Finally, it is to confirm that the uninterruptible power system is in a backfeed failure operation when the output voltage is coincident to the bypass input voltage and lasts for more than a predetermined time period (S206). On the contrary, when the output voltage is coincident to the bypass input voltage but lasts for less than the predetermined time period, it is to confirm that the uninterruptible power system is in a normal backup operation.

Especially, the uninterruptible power system with the function of backfeed failure detection includes a power conversion apparatus, a switch unit, a first voltage detection unit, a second voltage detection unit, and a comparison unit. The power conversion apparatus receives an AC power source and converts the AC power source to supply an AC load. The switch unit is connected to the power conversion apparatus and the switch unit can be a static transfer switch (STS). The first voltage detection unit detects the bypass input voltage of the power conversion apparatus and produces a first voltage signal. The second voltage detection unit detects the output voltage of the switch unit and produces a second voltage signal. The comparison unit receives the first voltage signal and the second voltage signal and compares the first voltage signal and the second voltage signal.

In particular, under the AC power source is disabled and the power conversion apparatus provides a backup power to supply the AC load, the switch unit is detected in a fault operation and the uninterruptible power system is in the backfeed failure operation when the first voltage signal is identical to the second voltage signal and lasts for more than a predetermined time period, whereas the switch unit is detected in the normal operation and the uninterruptible power system is in the normal backup operation when the first voltage signal is not identical to the second voltage signal. The input voltage is the same as the output voltage when the frequency, phase, and magnitude of the first voltage signal are completely identical to the frequency, phase, and magnitude of the second voltage signal and lasts for more than the predetermined time period, the switch unit is detected in the fault operation and the uninterruptible power system is in the backfeed failure operation when the first voltage signal is identical to the second voltage signal and lasts for more than the predetermined time period. On the contrary, the input voltage is not the same as the output voltage when at least one of the frequency, phase, and magnitude of the first voltage signal is not identical to at least one of the frequency, phase, and magnitude of the second voltage signal, the switch unit is detected in a normal operation and the uninterruptible power system is in a normal backup operation when the first voltage signal is not identical to the second voltage signal.

Figure 11:
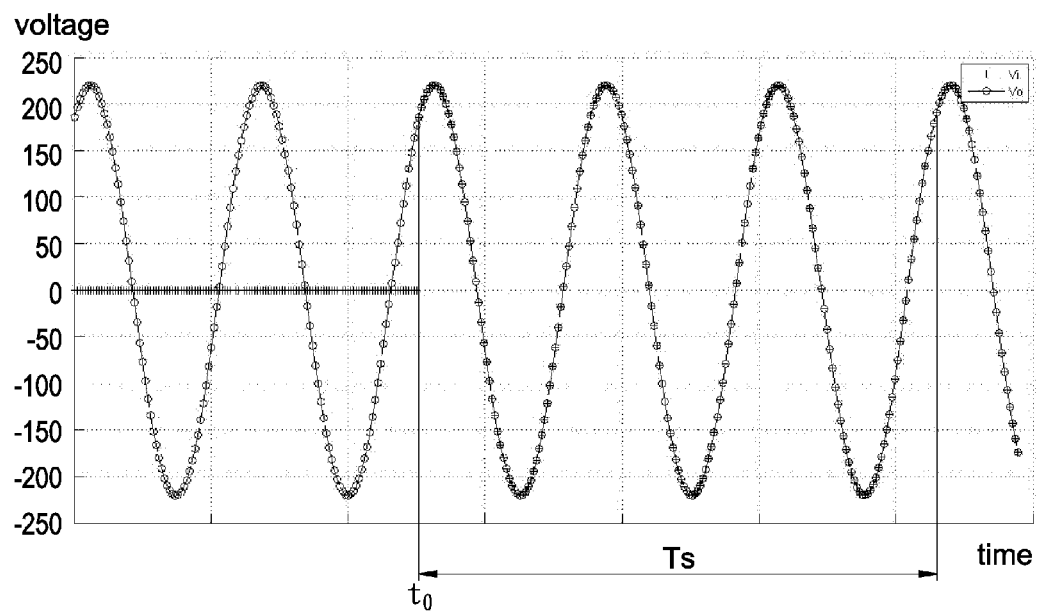
FIG. 11 is a schematic waveform graph of an input voltage and an output voltage of using the method of operating the uninterruptible power system according to the present disclosure.

Reference is made to FIG. 11 which is a schematic waveform graph of an input voltage and an output voltage of using the method of operating the uninterruptible power system according to the present disclosure. Under the AC power source is disabled and the power conversion apparatus provides a backup power to supply the AC load, the input voltage Vi (expressed by the plus sign) is not identical to the output voltage Vo (expressed by the circle sign) before an initial coincidence time point t0. It is assumed that a backfeed failure occurs at the initial coincidence time point t0. At this time, the input voltage Vi is identical to the output voltage Vo so that the input voltage Vi is coincident to the output voltage Vo. If the two voltage are coincident and lasts for more than a predetermined time period Ts (in this embodiment, the predetermined time period Ts is set to three cycles), the switch unit is detected in the fault operation and the uninterruptible power system is in the backfeed failure operation.

In conclusion, the present disclosure has following advantages:

1. Because of absence of the current transformer (CT), reduction in costs, simplicity of circuit designs, and utilization of occupied space can be accomplished;

2. Instead of the current transformer, the detections of frequency, amplitude, and phase of the input voltage and the output voltage can significantly reduce malfunctions due to interruption of the large-current detection; and 3. The detections of frequency, amplitude, and phase of the input voltage and the output voltage can significantly increase accuracy of detecting the backfeed failure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An uninterruptible power system, comprising:
a power conversion apparatus having an input terminal and an output terminal, the input terminal receiving an AC power source and converting the AC power source to supply an AC load;
a switch unit having a first input terminal, a second input terminal, and an output terminal switchably connected to the first input terminal or the second input terminal, the output terminal directly connected to the AC load, the second input terminal directly connected to the output terminal of the power conversion apparatus and the first input terminal directly connected to the input terminal of the power conversion apparatus;
a first voltage detection unit configured to detect an input voltage of the input terminal of the power conversion apparatus and configured to produce a first voltage signal, wherein the first voltage signal is an AC signal;

a second voltage detection unit configured to detect an output voltage of the output terminal of the switch unit and configured to produce a second voltage signal, wherein the second voltage signal is an AC signal; and a comparison unit configured to receive the first voltage signal and the second voltage signal and configured to compare the first voltage signal and the second voltage signal;

wherein when the AC power source is disabled, the switch unit output terminal is disconnected from the first input terminal and connected to the second input terminal, and the power conversion apparatus provides a backup power to supply the AC load, the switch unit is detected in a fault operation when the comparison unit determines that the first voltage signal is identical to the second voltage signal, the first and second voltage signals are determined to be identical when their frequency, phase, and magnitude are determined to be identical, and represents that the first input terminal and the second input terminal are shorted, whereas the switch unit is detected in a normal operation when the comparison unit determines that the first voltage signal is not identical to the second voltage signal;

wherein the power conversion apparatus comprises:

an energy storage apparatus configured to receive energy from the AC power source, and configured to provide the backup power to supply the AC load.

2. The uninterruptible power system in claim 1, wherein the power conversion apparatus further comprises:

an AC-to-DC conversion apparatus configured to receive the AC power source and configured to convert the AC power source into a first DC voltage;

a DC-to-AC conversion apparatus configured to receive the first DC voltage and configured to convert the first DC voltage into a first AC voltage;

a first DC-to-DC conversion apparatus configured to receive the first DC voltage and configured to convert the first DC voltage into a second DC voltage; and a second DC-to-DC conversion apparatus;

wherein the energy storage apparatus is configured to receive the second DC voltage and be charged by the second DC voltage to store energy and configured to produce a third DC voltage, and the second DC-to-DC conversion apparatus is configured to receive the third DC voltage and configured to convert the third DC voltage into a fourth DC voltage.

3. The uninterruptible power system in claim 2, wherein when the AC power source is disabled and the energy storage apparatus is provided to supply the backup power, the switch unit is detected in a fault operation and the uninterruptible power system is in a backfeed failure operation when the first voltage signal is identical to the second voltage signal; the switch unit is detected in a normal operation and the uninterruptible power system is in a normal backup operation when the first voltage signal is not identical to the second voltage signal.

4. The uninterruptible power system in claim 2, wherein the energy storage apparatus is a rechargeable battery and the first DC-to-DC conversion apparatus is a battery charger; the second DC voltage produced from the first DC-to-DC conversion apparatus is the required voltage for charging the energy storage apparatus.

5. The uninterruptible power system in claim 1, wherein the first voltage signal has frequency, phase, and magnitude of the AC power source, the second voltage signal has frequency, phase, and magnitude of the output voltage; the input voltage is identical as the output voltage when the frequency, phase, and magnitude of the first voltage signal are completely identical to the frequency, phase, and magnitude of the second voltage signal, the switch unit is detected in a fault operation and the uninterruptible power system is in a backfeed failure operation when the first voltage signal is identical to the second voltage signal; the input voltage is not identical as the output voltage when at least one of the frequency, phase, and magnitude of the first voltage signal is not identical to at least one of the frequency, phase, and magnitude of the second voltage signal, the switch unit is detected in a normal operation and the uninterruptible power system is in a normal backup operation when the first voltage signal is not identical to the second voltage signal.

6. The uninterruptible power system in claim 1, wherein the first voltage signal has frequency, phase, and magnitude of the AC power source, the second voltage signal has frequency, phase, and magnitude of the output voltage; the input voltage is identical as the output voltage when the frequency, phase, and magnitude of the first voltage signal are completely identical to the frequency, phase, and magnitude of the second voltage signal and lasts for more than a predetermined time period, the switch unit is detected in a fault operation and the uninterruptible power system is in a backfeed failure operation when the first voltage signal is identical to the second voltage signal and lasts for more than the predetermined time period; the input voltage is not identical as the output voltage when at least one of the frequency, phase, and magnitude of the first voltage signal is not identical to at least one of the frequency, phase, and magnitude of the second voltage signal, the switch unit is detected in a normal operation and the uninterruptible power system is in a normal backup operation when the first voltage signal is not identical to the second voltage signal.

7. The uninterruptible power system in claim 1, wherein the switch unit is a static transfer switch (STS).

8. A method of operating an uninterruptible power supply system, wherein the uninterruptible power supply system comprises:

a power conversion apparatus having an input terminal and an output terminal, the input terminal receiving an AC power source and converting the AC power source to supply an AC load, and the power conversion apparatus comprising an energy storage apparatus;

a switch unit having a first input terminal, a second input terminal, and an output terminal switchably connected to the first input terminal or the second input terminal, the second input terminal connected to the output terminal of the power conversion apparatus and the first input terminal connected to the input terminal of the power conversion apparatus, wherein the method comprises:

(a) determining the uninterruptible power system is operated in a backup supply operation when the AC power source is disabled, the switch unit output terminal is disconnected from the first input terminal and connected to the second input terminal, and the power conversion apparatus provides a backup power to supply the AC load;

(b) determining whether a bypass input voltage at the input terminal of the power conversion apparatus of the uninterruptible power system is detected when the uninterruptible power system is in the backup supply operation;

(c) determining by a comparison unit whether an output voltage of the output terminal of the switch unit is identical to the bypass input voltage and lasts for more than a predetermined time period when the bypass input voltage of the uninterruptible power system is detected, the bypass input voltage and the output voltage are determined to be identical when their frequency, phase, and magnitude are determined to be completely identical; and (d) determining that the switch unit is in a backfeed failure operation when it is determined that the output voltage is identical to the bypass input voltage and lasts for more than the predetermined time period, and represents that the first input terminal and the second input terminal are shorted.

9. The method of operating the uninterruptible power system in claim 8, wherein in step (d), confirming that the uninterruptible power system is in a normal backup operation when the output voltage is identical to the bypass input voltage but lasts for less than the predetermined time period.

10. The method of operating the uninterruptible power system in claim 9, wherein the uninterruptible power system comprises:
a first voltage detection unit configured to detect the bypass input voltage and configured to produce a first voltage signal;
a second voltage detection unit configured to detect the output voltage of the switch unit and configured to produce a second voltage signal; and
wherein the comparison unit is configured to receive the first voltage signal and the second voltage signal and configured to compare the first voltage signal and the second voltage signal.

11. The method of operating the uninterruptible power system in claim 10, wherein when the AC power source is disabled and the power conversion apparatus provides a backup power to supply the AC load, the switch unit is detected in a fault operation and the uninterruptible power system is in a backfeed failure operation when the first voltage signal is identical to the second voltage signal and lasts for more than a predetermined time period; the switch unit is detected in a normal operation and the uninterruptible power system is in a normal backup operation when the first voltage signal is not identical to the second voltage signal.

12. The method of operating the uninterruptible power system in claim 11, wherein the first voltage signal has frequency, phase, and magnitude of the AC power source, the second voltage signal has frequency, phase, and magnitude of the output voltage; the input voltage is identical as the output voltage when the frequency, phase, and magnitude of the first voltage signal are completely identical to the frequency, phase, and magnitude of the second voltage signal and lasts for more than the predetermined time period, the switch unit is detected in a fault operation and the uninterruptible power system is in the backfeed failure operation when the first voltage signal is identical to the second voltage signal and lasts for more than the predetermined time period; the input voltage is not identical as the output voltage when at least one of the frequency, phase, and magnitude of the first voltage signal is not identical to at least one of the frequency, phase, and magnitude of the second voltage signal, the switch unit is detected in a normal operation and the uninterruptible power system is in a normal backup operation when the first voltage signal is not identical to the second voltage signal.

13. The method of operating the uninterruptible power system in claim 10, wherein the switch unit is a static transfer switch (STS).

14. A method of operating an uninterruptible power supply system, wherein the uninterruptible power supply system comprises:
a power conversion apparatus having an input terminal and an output terminal, the input terminal receiving an AC power source and converting the AC power source to supply an AC load, the power conversion apparatus comprising an energy storage apparatus;
a switch unit having a first input terminal, a second input terminal, and an output terminal switchably connected to the first input terminal or the second input terminal, the second input terminal connected to the output terminal of the power conversion apparatus and the first input terminal connected to the input terminal of the power conversion apparatus;
wherein the method comprises the following steps:
(a) determining whether a bypass input voltage at the input terminal of the power conversion apparatus of the uninterruptible power system is detected;
(b) determining whether the uninterruptible power system is operated in a backup supply operation when the bypass input voltage of the uninterruptible power system is detected, the switch unit output terminal disconnected from the first input terminal and connected to the second input terminal, and the power conversion apparatus provides a backup power to supply the AC load;
(c) determining by a comparison unit whether an output voltage of the output terminal of the switch unit is identical to the bypass input voltage and lasts for more than a predetermined time period when the uninterruptible power system is in the backup supply operation; the bypass input voltage is determined to be identical to the output voltage when their frequency, phase, and magnitude are determined to be completely identical; and
(d) determining that the switch unit is in a backfeed failure operation when it is determined that the output voltage is identical to the bypass input voltage and lasts for more than the predetermined time period, and represents that the first input terminal and the second input terminal are shorted.

15. The method of operating the uninterruptible power system in claim 14, wherein in step (d), confirming that the uninterruptible power system is in a normal backup operation when the output voltage is identical to the bypass input voltage but lasts for less than the predetermined time period.

16. The method of operating the uninterruptible power system in claim 15, wherein the uninterruptible power system comprises:
a first voltage detection unit configured to detect the bypass input voltage and configured to produce a first voltage signal;
a second voltage detection unit configured to detect the output voltage of the switch unit and configured to produce a second voltage signal; and
wherein the comparison unit is configured to receive the first voltage signal and the second voltage signal and configured to compare the first voltage signal and the second voltage signal.

17. The method of operating the uninterruptible power system in claim 16, wherein when the AC power source is disabled and the power conversion apparatus provides a backup power to supply the AC load, the switch unit is detected in a fault operation and the uninterruptible power system is in a backfeed failure operation when the first voltage signal is identical to the second voltage signal and lasts for more than a predetermined time period; the switch unit is detected in a normal operation and the uninterruptible power system is in a normal backup operation when the first voltage signal is not identical to the second voltage signal.

18. The method of operating the uninterruptible power system in claim 17, wherein the first voltage signal has frequency, phase, and magnitude of the AC power source, the second voltage signal has frequency, phase, and magnitude of the output voltage; the input voltage is identical as the output voltage when the frequency, phase, and magnitude of the first voltage signal are completely identical to the frequency, phase, and magnitude of the second voltage signal and lasts for more than the predetermined time period, the switch unit is detected in a fault operation and the uninterruptible power system is in the backfeed failure operation when the first voltage signal is identical to the second voltage signal and lasts for more than the predetermined time period; the input voltage is not identical as the output voltage when at least one of the frequency, phase, and magnitude of the first voltage signal is not identical to at least one of the frequency, phase, and magnitude of the second voltage signal, the switch unit is detected in a normal operation and the uninterruptible power system is in a normal backup operation when the first voltage signal is not identical to the second voltage signal.

19. The method of operating the uninterruptible power system in claim 16, wherein the switch unit is a static transfer switch (STS).

* * * * *